Dec. 13, 1949     W. K. GREGORY     2,490,959
AIR CLEANER
Filed June 5, 1947
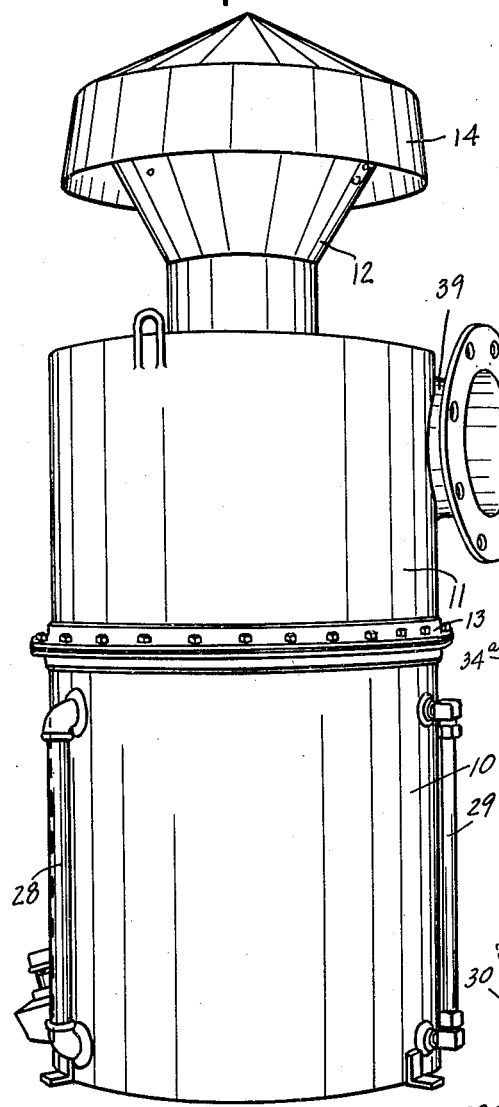
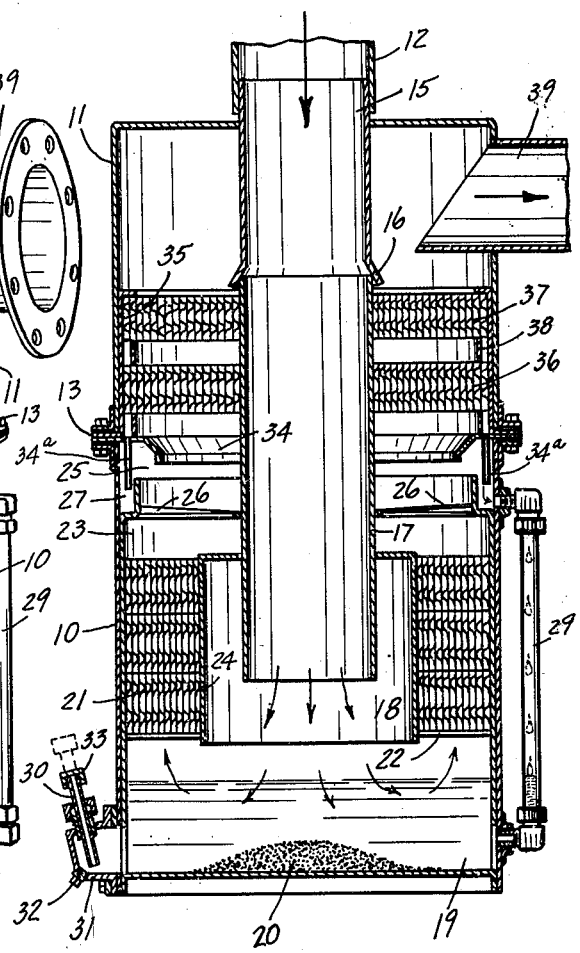
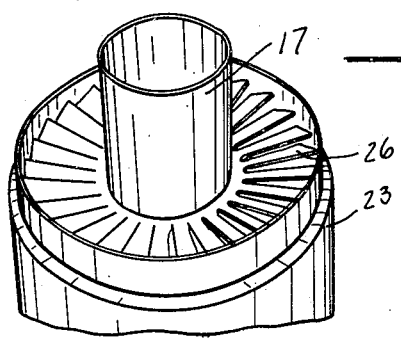
Inventor.
WILLIAM K. GREGORY.
By Lockwood, Goldsmith & Galt
Attorneys.

Patented Dec. 13, 1949

2,490,959

UNITED STATES PATENT OFFICE 2,490,959

AIR CLEANER

William K. Gregory, Louisville, Ky., assignor to Continental Air Filters, Inc., Louisville, Ky., a corporation Application June 5, 1947, Serial No. 752,721

6 Claims. (Cl. 183—15)

This invention relates to an oil bath air cleaner of the automatic self-cleaning type embodying a swirling action for relieving the air of oil and dust particles before being discharged, such cleaners being particularly adapted for use in connection with Diesel and gas engines.

It is the object of the invention to improve upon air cleaners of this general type in respect to efficiency and capacity, as well as the structural arrangement for facilitating dismantling and cleaning.

One feature of the invention resides in the provision of a filter media through which the oil laden air is caused to pass before final separation through centrifugal action, after which the freed air is further filtered in passing through sinuous oil coated filter channels.

Another feature of the invention resides in the provision of a sight gage for permitting convenient observation of the separated oil carried by the air from the oil bath, to thereby permit control of the required oil level for the most effective filtering operation.

A further feature of the invention resides in the provision of an oil level regulator by the adjustment of which the oil level may be established in accordance with the required air volume of the cleaner.

The full nature of the invention will be understood from the accompanying drawings and the following description and claims.

Fig. 1 is an elevation in perspective of the cleaner.

Fig. 2 is a central vertical section therethrough.

Fig. 3 is a perspective view of the swirl vanes through which the air is caused to pass.

In the drawings there is illustrated a cleaner of this type embodying three removable sections comprising a lower housing 10, an upper housing 11, and an air intake super structure 12. The housings 10 and 11 are secured in superimposed relation through the bolted flange rings 13 so as to permit convenient installation and dismantling. The super structure 12 is adapted to telescope over and be removably seated above the upper housing 11. Thus, the several units with their embraced filters may be separated and dismantled.

The super structure 12 includes a deflector cap 14 which protects the air inlet while permitting air intake into the upper end of the center tube 15 over which it is telescoped. The intake tube 15 is flanged at its lower end at 16 to embrace and communicate with the air passage tube 17 through which air is drawn downwardly into an expansion chamber 18. Below the expansion chamber there is an oil reservoir 19 containing a bath with entrapping oil to a predetermined level below the discharge end of said tube.

The air discharged into the expansion chamber 18 impinges against the oil causing the heavier dust particles carried thereby to be trapped and separated from the air in the form of a sludge deposit indicated at 20.

Surrounding the lower portion of the tube 17 and expansion chamber 18 there is provided a filter media 21 supported by a series of spaced cross wires 22 between the inner wall of the filter cell and the wall of the expansion chamber 24.

The filter media 21 is preferably in the form of a series of sinuous channels arranged generally vertically through which the air may pass upwardly into a precleaning swirl chamber 25. The channels of the filter media 21 may be formed by coiling a corrugated metal strip of the character more fully set forth and described in my copending application, filed May 15, 1947, Serial Number 748,163, entitled Air filter media. There may be two units or coils of such media superimposed one upon the other; however, any other character of filter may be employed such as to cause the oil laden air passing upwardly therethrough to be brought into intimate contact with the oil coated surface of the channels, mesh or the like. Thus, a thorough scrubbing action of the air occurs during its passage through the filter 21, which drives any dust particles into the flowing stream of oil separated from the air during its baffled and sinuous travel through the filter.

Mounted above the filter and about the tube 17 there are a series of stationary swirl vanes 26 such as to impart a swirling motion to the air and oil mixture as it passes from the cell 23 into the precleaning swirl chamber 25. As a result of this swirling motion the bulk of the remaining entrained oil is centrifuged outwardly against the peripheral wall of the chamber 25 to flow downwardly into the oil trap 27. Connected with the oil trap 27 there are provided oil return ducts 28 and 29. One or more ducts 28 is mounted exteriorly of the lower housing 10 for directing the oil from the trap 27 back to the oil reservoir 19.

The return oil duct 29 is preferably in the form of a sight gage, herein shown as comprising a glass tube between the end fittings. By means of the sight gage the amount of oil returning from the trap to the reservoir 19 may be observed. This is advantageous for determining the proper oil level to be maintained in the reservoir. Thus, if there is a heavy flow of oil through the sight gage the reservoir level should be reduced for providing the lowest resistance to air flow while still maintaining efficient air cleaning action. But if there is an insufficient flow observed, the air may not carry sufficient oil with it through the filter for efficient dust separation. Preferably, the returning oil through the sight gage should comprise a light stream, such as will not entirely fill the sight gage.

To control the oil level in the reservoir as may be determined by the sight gage 29 or the volume of air to be processed, there is provided an oil level regulator in the form of an adjustable filler tube 30. A removable clean out plate 31 having a drain plug 32 is provided at the bottom of the housing 10 in communication with the reservoir. The filler tube 30 is slidably mounted in the top of the plate to varying levels as indicated by full and dotted lines. It is provided with a filler cap 33 which may be removed for introducing oil into the reservoir. It will be observed that the oil level in the reservoir may be varied in accordance with the elevation of the filler tube wherein it is filled to its upper end.

The superimposed housing 11 is separated from the lower housing and swirl chamber 25 by a downwardly flanged apron 34 such as to prevent the centrifuged oil from being thrown upwardly through its open throat. However, the air is drawn therethrough and through the filter cell 35 which houses a pair of filter units 36 and 37 separated by a spacing ring 38. The centrifugal action will direct any further excess oil into the dead air space surrounding the ring 38 from whence it will be free to flow downward without encountering the upwardly drawn air stream. The apron 34 is provided with a plurality of drain tubes 34a about its periphery for conducting the oil collected in the filter units 36 and 37 to the oil trap 27 from which it is returned to the oil reservoir 19 in the manner previously described.

The filter units 36 and 37 may be of any type which will present an extended surface on which oil spray and dust may be collected, such as crimped wire, screen cloth, or coiled corrugated strips of the character disclosed in my above mentioned application for letters patent. The cleaned air, with most of the dust and oil removed, therefore passes upwardly through the filters 36, 37 where the last traces of oil and dust are separated; whereupon the air passes out through the discharge tube 39. However, there will be sufficient oil carried into the filters 36 and 37 to coat the filter media thereof through which the air passes such as to entrap and effect separation of the last traces of dust. Also, the impingement of the air on the filter media causes any remaining oil particles carried thereby to be deposited so that the air issuing from the cleaner to the pipe 39 will be oil free, as well as dust free.

Upon removing the super structure 12 and separating the lower and upper housings 10 and 11 through disconnecting their flange rings 13, the filter cells 23 and 35, respectively, and the filter units contained therein may be readily removed for inspection and any servicing which may be necessary from time to time.

The invention claimed is:

1. In an air cleaner of the oil bath type having a housing with an air inlet and outlet, a reservoir for containing liquid against which air is directed from the inlet, and filtering means through which air and liquid entrained therein is passed to the outlet, the combination therewith of a baffle element secured in said housing above the liquid reservoir against which air and entrained liquid are caused to impinge in flowing toward the outlet, a liquid trap for receiving entrained liquid deflected therein by said baffle element, and a visual liquid return conduit connecting said trap with the reservoir for directing liquid from said trap back to the reservoir with visual indication of the rate of liquid flow therethrough.

2. In an air cleaner of the oil bath type having a housing with an air inlet and outlet, a reservoir for containing liquid against which air is directed from the inlet, and filtering means through which air and liquid entrained therein is passed to the outlet, the combination therewith of a liquid trap in the outlet portion of said housing for receiving liquid released from the air in passing therethrough, and a visual liquid return conduit connecting said trap with the reservoir for directing liquid from said trap back to the reservoir with visual indication of the rate of liquid flow therethrough.

3. In an air cleaner of the oil bath type having a housing with an air inlet and outlet, a reservoir for containing liquid against which air is directed from the inlet, and filtering means through which air and liquid entrained therein is passed to the outlet, the combination therewith of a liquid trap in the outlet portion of said housing for receiving liquid released from the air pasing therethrough, a visual liquid return conduit connecting said trap with the reservoir for directing liquid from said trap back to the reservoir with visual indication of the rate of liquid flow therethrough, and a filler tube communicating with said reservoir and slidably mounted relative thereto to a predetermined elevation through which liquid is introduced to said reservoir to a level corresponding with the elevation of said filler tube, the liquid level in said reservoir being thereby determined according to the rate of flow of liquid through said visual return conduit.

4. In an air cleaner of the oil bath type having a housing with an air inlet and outlet, a reservoir for containing liquid against which air is directed from the inlet, and filtering means through which air and liquid entrained therein is passed to the outlet, the combination therewith of an annular series of swirl vanes mounted in said housing above at leat a portion of the filtering means and spaced therefrom to impart a liquid separating swirling motion to the air passing to the outlet, a downwardly and inwardly cupped baffle ring mounted in said housing above said vanes for receiving the air and liquid entrained therein centrifuged by the vanes, a liquid trap below said baffle for receiving air released liquid therefrom, and a visual liquid return conduit connecting said trap with the reservoir for directing liquid from said trap back to the reservoir with visual indication of the rate of liquid flow therethrough.

5. In an air cleaner of the oil bath type having a housing with an air inlet and outlet, a reservoir for containing liquid against which air is directed from the inlet, and filtering means through which air and liquid entrained therein is passed to the outlet, the combination therewith of an annular series of swirl vanes mounted in the outlet portion of said housing to impart a liquid separating swirling motion to the air passing therethrough, a liquid trap for receiving the liquid released by said swirling motion, and a visual liquid return conduit connecting said trap with the reservoir for directing liquid from said trap back to the reservoir with visual indication of the rate of liquid flow therethrough.

6. In an air cleaner of the oil bath type having a housing with an air inlet and outlet, a reservoir for containing liquid against which air is drected from the inlet, and filtering means through which air and liquid entrained therein is passed to the outlet, the combination therewith of an annular series of swirl vanes mounted in the outlet portion of said housing to impart a liquid separating swirling motion to the air passing therethrough, a liquid trap for receiving the liquid released by said swirling motion, a visual liquid return conduit connecting said trap with the reservoir for directing liquid from said trap back to the reservoir with visual indication of the rate of liquid flow therethrough, and a filler tube communicating with said reservoir and slidably mounted relative thereto to a predetermined elevation through which liquid is introduced to said reservoir to a level corresponding with the elevation of said filler tube, the liquid level in said reservoir being thereby determined according to the rate of flow of liquid through said visual return conduit.

WILLIAM K. GREGORY.

REFERENCES CITED

The following references are of record in the file of this patent:

UNITED STATES PATENTS

| Number | Name | Date |
|---|---|---|
| 1,783,813 | Schneible | Dec. 2, 1930 |
| 1,851,427 | Hinkle | Mar. 29, 1932 |
| 1,875,471 | Lowther | Sept. 6, 1932 |
| 2,062,548 | Wilson | Dec. 1, 1936 |
| 2,250,226 | Juelson | July 22, 1941 |
| 2,280,417 | Lundberg et al. | Apr. 21, 1942 |
| 2,309,838 | Fitch et al. | Feb. 2, 1943 |

FOREIGN PATENTS

| Number | Country | Date |
|---|---|---|
| 557,470 | Great Britain | Nov. 22, 1943 |